Figure 1:
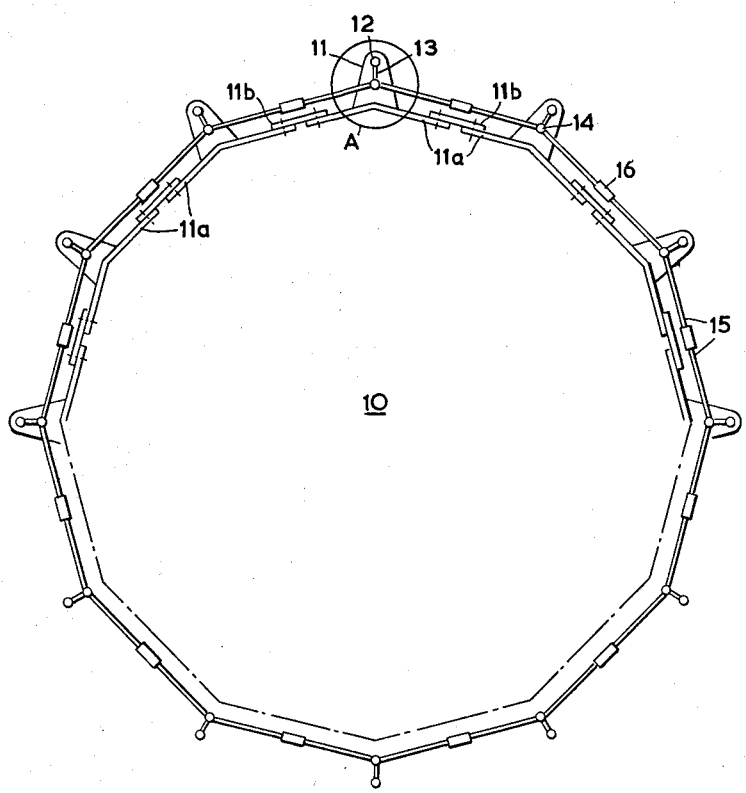
Figure 2:
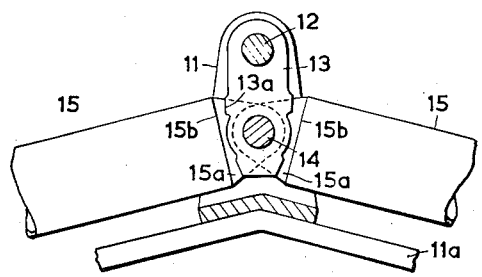
Figure 3:
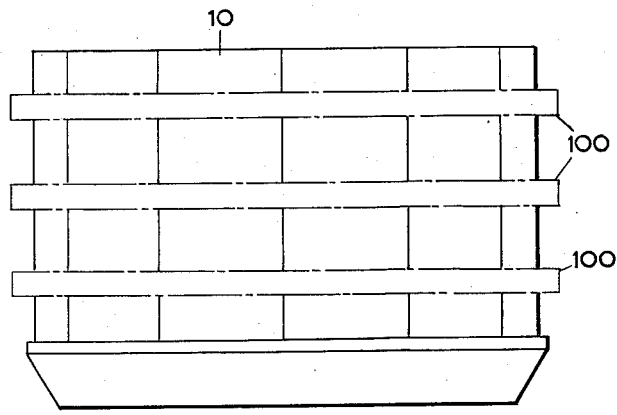
Figure 4:
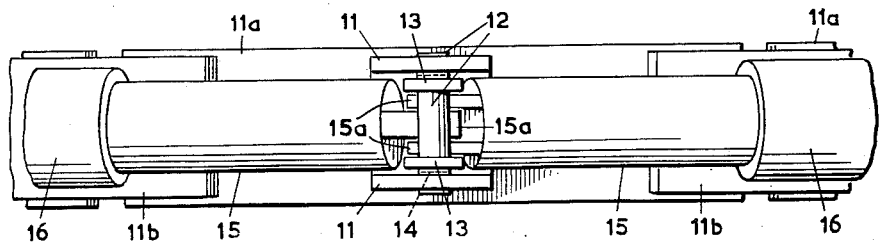

May 8, 1962 D. F. SEYMOUR ET AL 3,032,844
STRUCTURE SUPPORTING LINKWORK ASSEMBLIES
Filed Dec. 23, 1957 3 Sheets-Sheet 1

May 8, 1962   D. F. SEYMOUR ET AL   3,032,844
STRUCTURE SUPPORTING LINKWORK ASSEMBLIES
Filed Dec. 23, 1957   3 Sheets-Sheet 3 ered May 8, 1962

3,032,844
STRUCTURE SUPPORTING LINKWORK ASSEMBLIES

Douglas Frank Seymour and John Walton, Whetstone, near Leicester, England, assignors to The English Electric Company Limited, London, England, a British company
Filed Dec. 23, 1957, Ser. No. 704,381
Claims priority, application Great Britain Jan. 4, 1957
6 Claims. (Cl. 24—16)

This invention relates to means for applying external support to a body or structure such as for example a composite moderator structure of a gas-cooled graphite-moderated power producing reactor.

According to the present invention a linkwork assembly for applying external support to a structure comprises in combination a plurality of link members disposed end to end in a ring-like manner so as, when the assembly is in position around the structures, to encircle the structure and have radial clearance therefrom, for each pair of link members a coupling member or means pivotally connected at its inner end to the adjacent ends of the said pair of link members and extending outwardly from the link members, for each coupling member a support means pivotally connected at its outer end to the outer end of the coupling member and projecting inwardly of the link members so as to bear on and support the structure, the link and coupling members being free to move circumferentially relative to the structure so as to equalise the tensions in the respective link members.

According to another feature of the present invention each coupling member and the link members connected therewith are provided with opposing portions which are effective to engage together should any of the link members break, and thereby limit the pivotal movement of the coupling member relative to the link members.

Adjacent support members may be loosely connected together circumferentially in a manner such that in the event of one of the link members breaking, the support means associated with each end of the broken link member carry at least a substantial part of the circumferential load formerly carried by the broken link member, the support means under normal conditions carrying no circumferential load.

Referring now to the FIGURES 1 to 4 of the drawings, the composite graphite moderator structure 10 which is shown in outline only is supported externally by a number of linkwork assemblies 100 which encircle the structure and which are vertically spaced apart thereon. Each linkwork assembly comprises a plurality of link members 15 which together encircle the structure, being disposed end to end and spaced away from the structure. The adjacent clevissed ends 15a of each pair of adjacent link members 15 are pivotally connected by a pivot pin 14 to two outwardly extending coupling members 13 disposed above and below the clevissed ends. The outer ends of each pair of coupling members 13 are pivotally connected by means of a pivot pin 12 to the outer end of an inwardly extending support member comprising a U-shaped bracket 11 extending inwardly within the closed linkage formed by the link members and carrying at its inner end a support plate 11a which bears against the external surface of the moderator structure whereby to apply external pressure thereto.

Each link member is provided with a centrally disposed turnbuckle device 16 for adjusting the effective length of the link member and for adjusting, when the linkwork assembly is in position around the moderator structure, the tensions in the link members.

Each linkwork assembly is so adjusted that the coupling members 13 are disposed substantially radially, the complete linkwork assembly then being substantially symmetrical in plan view as shown in FIG. 1. Since the link members 15 are not attached in a rigid manner directly to the support members 11, 11a but in a floating manner through the coupling members 13, the link members all carry substantially equal tensions and the respective support plates 11a apply substantially equal supporting forces to the moderator structure. Any tendency for one of the link members to carry an increased tension is counteracted by movement of the various components of the linkwork assembly whereby to distribute any increase in tension throughout the whole assembly.

Thus, operation of one of the turnbuckle devices 16 whereby to adjust the length of its associated link member is effective to increase, or decrease, the tensions in all of the link members and not just the tension in the associated link member.

Likewise any tendency for the moderator structure to change its shape or size when in operation results in substantially uniform changes in the tensions in all of the link members so that no individual link member or other member of the assembly can be overloaded relative to other similar members. It will therefore be appreciated that any change in the tensions in any one or more of the link members which might otherwise have occurred if the link members had been connected directly to the support members is distributed throughout the whole of the linkwork assembly.

The support plates 11a are arranged to extend just less than half way along each face of the moderator structure, and adjacent ends of adjacent support plates are connected loosely together by sliding joint plates 11b which are arranged by means of bolts operating in slotted holes to allow normal movement of the support plates as the moderator structure changes in shape and size during normal operation, but in the event of one of the link members breaking to limit the separation of the support plates associated with the broken link member and to carry at least part of the load normally carried by the broken link member.

Furthermore each coupling member 13 is provided with abutments 13a which, in the event of the failure of any one of the link members, are arranged to engage with further abutments or shoulders 15b formed on the clevissed ends of the link members 15 whereby to limit to a low value the relative angular movement of the coupling members 13 and the associated link members 15 which results from such failure of a link member, the tensions in the remaining link members, and the radial support derived therefrom, being thus not entirely lost.

Thus on failure of any one of the link members the appropriate sliding joint plate takes up the tension of the broken link member, and any movement of the support members 11, 11a associated with the broken link member is only partly transmitted to the other parts of the linkwork assembly.

Whereas the tensions in the link members may be adjusted by means of the turnbuckle devices 16 associated with the link members 15, other means may be used for varying the tensions in the link members.

In a modification of the above described linkwork assembly, the coupling members 13 are replaced by other coupling members to which the respective link members 15 are pivotally connected at positions spaced apart at the base corners of an isosceles triangle, each coupling member being pivotally connected with the respective support member at a position disposed at the apex of the isosceles triangle.

Figure 5:
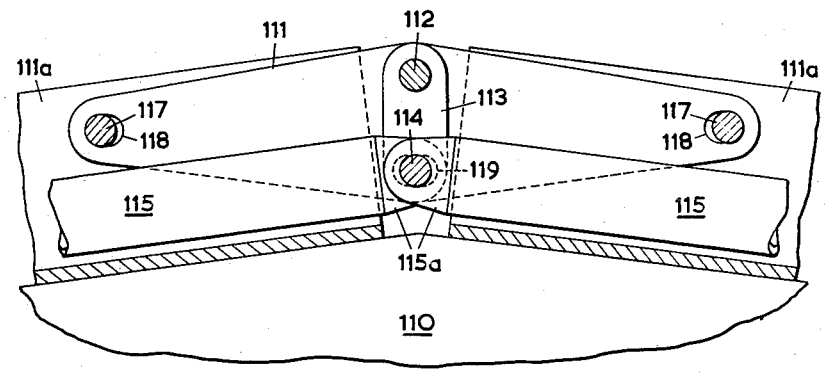

Referring now to the modified linkwork assembly shown in the FIG. 5, the assembly comprises a plurality of link members 115 which as in the previously described linkwork assembly together encircle the moderator structure 110, being disposed end to end and spaced away from the structure. Adjacent clevissed ends 115a of each pair of adjacent link members 115 are pivotally connected by pivot pins 114 to outwardly extending coupling members 113. The outer end of each coupling member is pivotally connected by means of a pivot pin 112 to inwardly extending support members constituted by a pair of diamond-shaped side plates 111. The latter are arranged to bear on bearing pins 117 secured firmly in adjacent end portions of adjacent support beams 111a which extend along the respective faces of the moderator structure. The support beams 111a are disposed parallel to the link members 115, and are located at the centre of each face of the moderator structure so as to prevent circumferential movement of the whole linkwork assembly.

The bearing pins 117 pass through slotted holes 118 in the side plates 111, the holes 118 being arranged such that movement of the support beams under normal operating conditions (for example due to differential expansion of the moderator structure and the linkwork assembly, and Wigner growth) is not impeded, but such that in the event of failure of one of the link members the resulting movement of the support beam associated with the broken link member causes the pins 117 to move to the outer ends of the slotted holes 118 so as to cause that support beam to carry at least part of the load previously carried by the broken link member. The linkwork assembly thus remains effective to support the moderator structure even after failure of one of the link members.

Each pivot pin 114 is extended on either side of the clevissed ends 115a so as to pass through slotted holes 119 formed in the side plates 111, these slotted holes being arranged to limit the relative angular movement of the coupling members 113 and the link members 115 to the desired low value should one of the link members break.

What we claim as our invention and desire to secure by Letters Patent, is:

1. A linkwork assembly for applying external support to a structure comprising, in combination, a plurality of link members disposed end to end in a ring-like manner so as, when the assembly is in position around the structure, to encircle the structure and have radial clearance therefrom, for each pair of link members a coupling member pivotally connected at its inner end to the adjacent ends of the said pair of link members and extending outwardly from the link members, for each coupling member a support means pivotally connected at its outer end to the outer end of the coupling member and projecting inwardly of the link members so as to bear on and support the structure, the link and coupling members being free to move circumferentially relative to the structure so as to equalise the tensions in the respective link members.

2. A linkwork assembly according to claim 1, wherein adjacent ends of each pair of link members are pivotally connected to the associated coupling member at the same position thereon.

3. A linkwork assembly according to claim 1, wherein each coupling member and the link members connected therewith are provided with opposing portions which are effective to engage together should any of the link members break, and thereby limit the pivotal movement of the coupling member relative to the link members.

4. A linkwork assembly according to claim 2, wherein each coupling member is pivotally connected with its associated members by means of a pivot pin which extends through a slotted hole formed in the support means, the slotted hole being arranged so as to limit the angular movement of the coupling member on breakage of one of the link members associated with the coupling member.

5. A linkwork assembly according to claim 3, wherein adjacent support means are loosely connected together circumferentially in a manner such that in the event of one of the link members breaking the support means associated with each end of the broken link member carry at least a substantial part of the circumferential load formerly carried by the broken link member, the support means under normal conditions carrying no circumferential load.

6. A linkwork assembly according to claim 1, wherein the support means are constituted by a plurality of support beams disposed parallel with the respective link members so as to bear against the structure whereby to support it, and for each coupling member a support member pivotally connected at its outer end to the outer end of the coupling member, and connected at its inner end at circumferentially-spaced positions thereon with the adjacent support beams by means of pin and slotted hole connections for enabling each support beam to carry, in the event of the breakage of the associated link member, at least a substantial part of the circumferential load formerly carried by the broken link member.

References Cited in the file of this patent

UNITED STATES PATENTS

| | | |
|---|---|---|
| 320,605 | Weimer | June 23, 1885 |
| 1,497,142 | Hart | July 10, 1924 |
| 2,206,679 | Siebert | June 2, 1940 |
| 2,865,828 | Long et al. | Dec. 23, 1958 |

OTHER REFERENCES

Proceedings of the Intermediate Conference on the Peaceful Uses of Atomic Energy Held in Geneva Aug. 8–20, 1955, vol. 2, United Nations, N.Y., 1956, pp. 404, 411, 412, 436. (In Library.)